(12) United States Patent
Wallach (10) Patent No.: US 11,237,970 B2
(45) Date of Patent: Feb. 1, 2022

(54) REDUCE DATA TRAFFIC BETWEEN CACHE AND MEMORY VIA DATA ACCESS OF VARIABLE SIZES

(71) Applicant: Micron Technology, Inc., Boise, ID (US)

(72) Inventor: Steven Jeffrey Wallach, Dallas, TX (US)

(73) Assignee: Micron Technology, Inc., Boise, ID (US)

( * ) Notice: Subject to any disclaimer, the term of this patent is extended or adjusted under 35 U.S.C. 154(b) by 102 days.

(21) Appl. No.: 16/183,661

(22) Filed: Nov. 7, 2018

(65) Prior Publication Data

US 2020/0142832 A1 May 7, 2020

(51) Int. Cl.
*G06F 12/0842* (2016.01)

(52) U.S. Cl.
CPC .. *G06F 12/0842* (2013.01); *G06F 2212/1008* (2013.01); *G06F 2212/608* (2013.01)

(58) Field of Classification Search
CPC ....... G06F 2212/1008; G06F 2212/608; G06F 12/0842
See application file for complete search history.

(56) References Cited

U.S. PATENT DOCUMENTS

| | | | |
|---|---|---|---|
| 8,176,252 B1 * | 5/2012 | Alexander | G06F 13/28 710/22 |
| 2007/0094475 A1 | 4/2007 | Bridges et al. | |
| 2011/0153983 A1 * | 6/2011 | Hughes | G06F 9/30043 712/22 |
| 2013/0124794 A1 | 5/2013 | Bux et al. | |
| 2013/0132675 A1 | 5/2013 | Sleiman et al. | |
| 2013/0326127 A1 | 12/2013 | Ferrari et al. | |
| 2015/0089159 A1 * | 3/2015 | Busaba | G06F 12/0815 711/144 |
| 2015/0106567 A1 * | 4/2015 | Godard | G06F 12/0292 711/121 |
| 2016/0246723 A1 * | 8/2016 | Doshi | G06F 12/0811 |

OTHER PUBLICATIONS

Carter, John, et al. "Impulse: Building a smarter memory controller." High-Performance Computer Architecture, 1999. Proceedings. Fifth International Symposium On. IEEE, 1999. (Year: 1999).*

(Continued)

*Primary Examiner* — Charles Rones
*Assistant Examiner* — Hewy H Li
(74) *Attorney, Agent, or Firm* — Greenberg Traurig (57) ABSTRACT

A computing system, method and apparatus to cache a portion of a data block. A processor can access data using memory addresses in an address space. A first memory can store a block of data at a block of contiguous addresses in the space of memory address. A second memory can cache a first portion of the block of data identified by an item selection vector. For example, response to a request to cache the block of data stored in the first memory, the computing system can communicate the first portion of the block of data from the first memory to the second memory according to the item selection vector without accessing a second portion of the block of data. Thus, different data blocks in the first memory of a same size can be each cached in different cache blocks of different sizes in the second memory.

16 Claims, 7 Drawing Sheets

(56) References Cited

OTHER PUBLICATIONS

Swanson, Mark, Leigh Stoller, and John Carter. "Increasing TLB reach using superpages backed by shadow memory." ACM SIGARCH Computer Architecture News 26.3 (1998): 204-213. (Year: 1998).*
Drepper, Ulrich. "What every programmer should know about memory." Red Hat, Inc 11 (2007): 2007. (Year: 2007).*
Schmidt, Christopher, et al. "A case for hardware-supported sub-cache line accesses." Proceedings of the 14th International Workshop on Data Management on New Hardware. Jun. 2018. (Year: 2018).*
Addressing mode, Wikipedia, printed on Oct. 19, 2018.
CPU cache, Wikipedia, printed on Oct. 22, 2018.
Cache (computing), Wikipedia, printed on Oct. 19, 2018.
Gather-scatter (vector addressing), Wikipedia, printed on Oct. 19, 2018.
Locality of reference, Wikipedia, printed on Nov. 6, 2018.
International Search Report and Written Opinion, PCT/US2019/059891, dated Feb. 24, 2020.

* cited by examiner

REDUCE DATA TRAFFIC BETWEEN CACHE AND MEMORY VIA DATA ACCESS OF VARIABLE SIZES

FIELD OF THE TECHNOLOGY

At least some embodiments disclosed herein relate generally to computer architecture and more specifically, but not limited to, techniques for reducing data traffic between cache and memory.

BACKGROUND

A computer can have different memory components, such as an internal cache memory in a processor, an external cache memory, a main memory, a local storage device, and/or a networked storage device. A processor of a computer can access some of the memory components faster, and with lower latency, than accessing other memory components.

A faster memory can be configured as a cache for a slower memory. The cache can store a copy of data of the slower memory such that subsequent access to the data in the cache is faster than accessing the slower memory for the data. Similarly, a computing result generated by the processor can be initially stored in the cache such that subsequent access to the result in the cache is faster than storing the result directly in the slower memory for subsequent access.

For example, a central processing unit (CPU) can have an amount of memory configured as a cache for a main memory. The CPU cache can be on or close to the CPU in data access paths and operate faster than the main memory.

BRIEF DESCRIPTION OF THE DRAWINGS

The embodiments are illustrated by way of example and not limitation in the figures of the accompanying drawings in which like references indicate similar elements.

DETAILED DESCRIPTION

The present disclosure includes techniques for reducing memory access traffic by selectively caching items in a data block, instead of caching an entire cache block (or cache entry) of a predetermined size.

Conventionally, cached data is organized in blocks of a predetermined size to take advantage of data locality in an address space. The predetermined size is typically a power of two. When a data item is accessed by a processor, space locality allows the inference that other data items stored close to, or adjacent to, the data item in the address space will be likely accessed also. For example, if a cache block has eight 64-bit words, these words are located in the contiguous address span, for example, as word_0, word_1, word_2, word_3, word_4, word_5, word_6, and word_7. Thus, if word_2 is referenced, the close/adjacent words would be word_0, word_1, word_3, word_4, word_5, word_6, and word_7. Thus, in response to a determination to load the data item from a memory to a cache, the entire data block containing the data item in the address space is fetched/loaded from the memory to the cache and stored in the cache as a cache block (or cache entry) of a predetermined size. Different cache blocks have the same predetermined size. However, in some instances, certain data items in the cache block will not be used (e.g., not all of the data words in the cache block are accessed).

At least some embodiments presented in the disclosure allows a controller of a cache to selectively cache only some of the data items in a block. Thus, the transmission of other data items in the block, from a memory to the cache, can be eliminated. In some instances, a cache block can have a variable size such that storage capacity in the cache for data items not cached for the data block can be used for other cache blocks. Alternatively, each cache block can have a predetermined size to simplify block management; however, a variable number of actual data items can be stored in the cache block to at least reduce the communications between the cache and the memory. Reducing the number of cached data items can improve the latency for caching the block and/or save the communication bandwidth for other operations. Additionally, the usage of the electrical energy for the communications of unused data items is eliminated.

Figure 1:
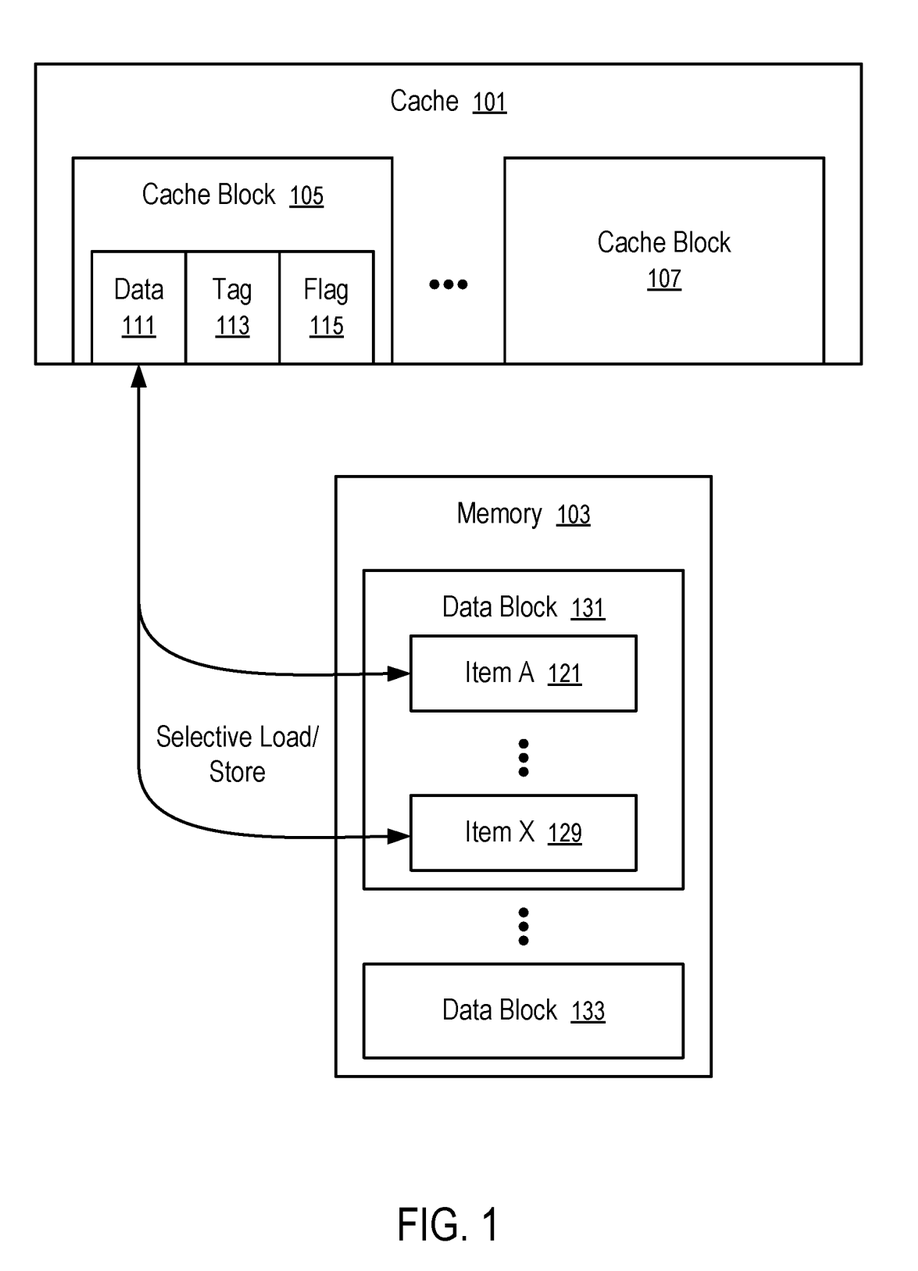
FIG. 1 shows a portion of a computer system configured to selectively communicate data between a cache block and a memory block.

FIG. 1 shows a portion of a computer system configured to selectively communicate data between a cache block and a memory block. For example, the portion illustrated in FIG. 1 can be part of the computer system of FIG. 7.

In FIG. 1, a cache (101) functions as a proxy of a memory (103). When a data item (e.g., 121, or 129) in the memory (103) is to be accessed at a memory address, the cache (101) is checked to determine whether the data item (e.g., 121, or 129) is already in a cache block (105) in the cache (101).

A typical cache block (105) in the cache (101) stores a tag (113) that identifies which data block (131) in the memory (103) is being cached in the cache block (105). The cache block (105) can be used to cache any of a subset of data blocks in the memory (103), or any of all of the data blocks (121, ..., 129) in the memory (103). The tag (113) identifies the particular data block (131) that is currently being cached in the cache block (105).

The cache block (105) in the cache (101) stores cached data (111) that correspond to the data items (121, ..., 129) in a data block (121) that is being cached.

Conventionally, the data blocks (e.g., 131, ..., 133) in the memory (103) are organized to have a predetermined size (e.g., each containing a predetermined number of data items); and each cache block (e.g., 105, ..., or 107) has the same size. When a data block (e.g., 131) is cached in a cache block (e.g., 105), the entire set of data items (121, ..., 129) of the data block (103) is cached in the cache block (105) as the cached data (111).

In FIG. 1 of the present disclosure, the cache block (105) in the cache (101) can selectively load or store some of the data items (121, ..., 129) of the data block (131), but none of the remaining data items. Such an arrangement can be used to avoid the data communications for loading or storing data items that are in the data block (131) but not used in a period of time (e.g., for a time duration in which the data block (131) is to be cached in the cache (101)).

For example, in some instances, it can be determined that subsequent operations will be performed on data items (121 and 129) but not on other data items in the data block (131). The determination can be based on an inference, based on a programmed condition, based on a recent data usage pattern observed in a past period of time, or based on a prediction made for a subsequent period of time. For example, temporal locality allows the inference that once a data item is used, it is likely that the data item will be used again in a subsequent period of time.

In such a situation, a controller of the cache (101) can load the data items (121, 129) into the cache block (105), but not the other data items in the data block (131). Thus, the data communication between the data block (131) and the cache block (105) can have a variable size, depending on the item selection of the cache block (105).

In FIG. 1, for example, the tag (113) can include data to identify not only which block (e.g., 131) in the memory (103) is cached in the cache block (105), but also which data items in the data block (e.g., 131) are currently being cached in the cache block (105).

In some implementations, each cache block (105) has a predetermined size that offers sufficient capacity to store all of the data items (121, . . . , 129) of a data block (131). However, it is not necessary for the cache (101) to load all of the data items (121, . . . , 129) into the cache block (105). The tag (113) identifies which data items are stored in the cache block (105). The cache block (105) can have a variable number of cached data items stored in the block (105) having a fixed, predetermined capacity. The use of cache blocks (105, . . . , 107) of a same, predetermined capacity can simplify the management of block mapping between the cache blocks (e.g., 105) in the cache (101) and the data blocks (e.g., 131) in the memory (103).

In other implementations, each cache block (105) can be allocated with a variable capacity that is tailored to the number of selected data items (e.g., 121 and 129) that are cached in the cache block (105). Thus, the storage capability in the cache (101) that would be reserved for the non-cached data items can be freed for caching other data blocks (e.g., 133).

The cache block (105) can include a flag (115) that identifies the status of the cache block (105). For example, the flag can indicate whether the cache block (105) has valid data, and/or whether the cached data (111) is more up-to-date than the corresponding items in the memory (103).

In some implementations, the flag (115) specifically identifies which data items in the cached data (111) is more up-to-date than the corresponding data item in the data block (131). Thus, in response to a determination to commit the cached data (111) to the memory (103), a controller of the cache (101) selectively communicates data items to the memory (103) for storing the data items in the data block (131). Such an approach can reduce the data communication from the cache (101) to the memory (103) and reduce the write operations in the memory (103). Reducing write operations can improve the longevity of some types of memories, such as flash memories that are formed based on negative-or (NOR) or negative-and (NAND) logic circuits.

Examples of item selections in the tag (113) and/or the flag (115) are discussed below in connection with FIGS. 2-4.

Figure 2:
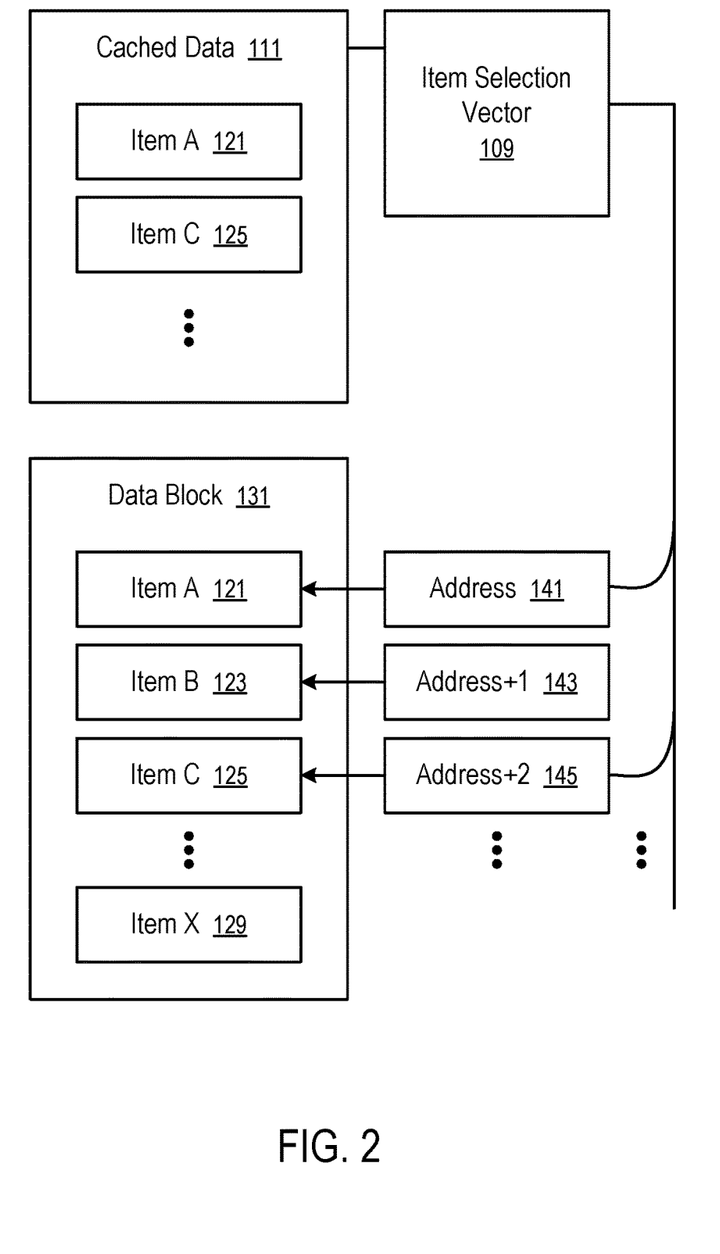
FIG. 2 illustrates an item selection vector to reduce data traffic between a cache and a memory.

FIG. 2 illustrates an item selection vector (109) to reduce data traffic between a cache and a memory, such as the cache (101) and the memory (103) illustrated in FIG. 1.

In FIG. 2, each data item (121, 123, 125, . . . , 129) in a data block (131) has a predetermined size and addressable separately using a memory address (141, 143, 145, . . . ) identified by a processor. The data items (121, 123, 125, . . . ) are sequentially stored at addresses (141, 143, 145, . . . ). The leading data item (121) in the data block (131) has an address (141); each subsequent data item (e.g., 123 or 125) has an address (e.g., 143 or 145) that is offset by one from the address (e.g., 141, or 143) of the previous data item (e.g., 121 or 123).

The item selection vector (109) of the cached data (111) identifies which of the addresses (141, 143, 145, . . . ) are included in the selection for the cached data (111) and which of the addresses (141, 143, 145, . . . ) are excluded from the selection for the cached data (111).

For example, the item selection vector (109) can be used to selectively load data items for storing in the cache block (105) and/or to selectively store updated data items back from the cache block (105) to the memory (103).

Figure 3:
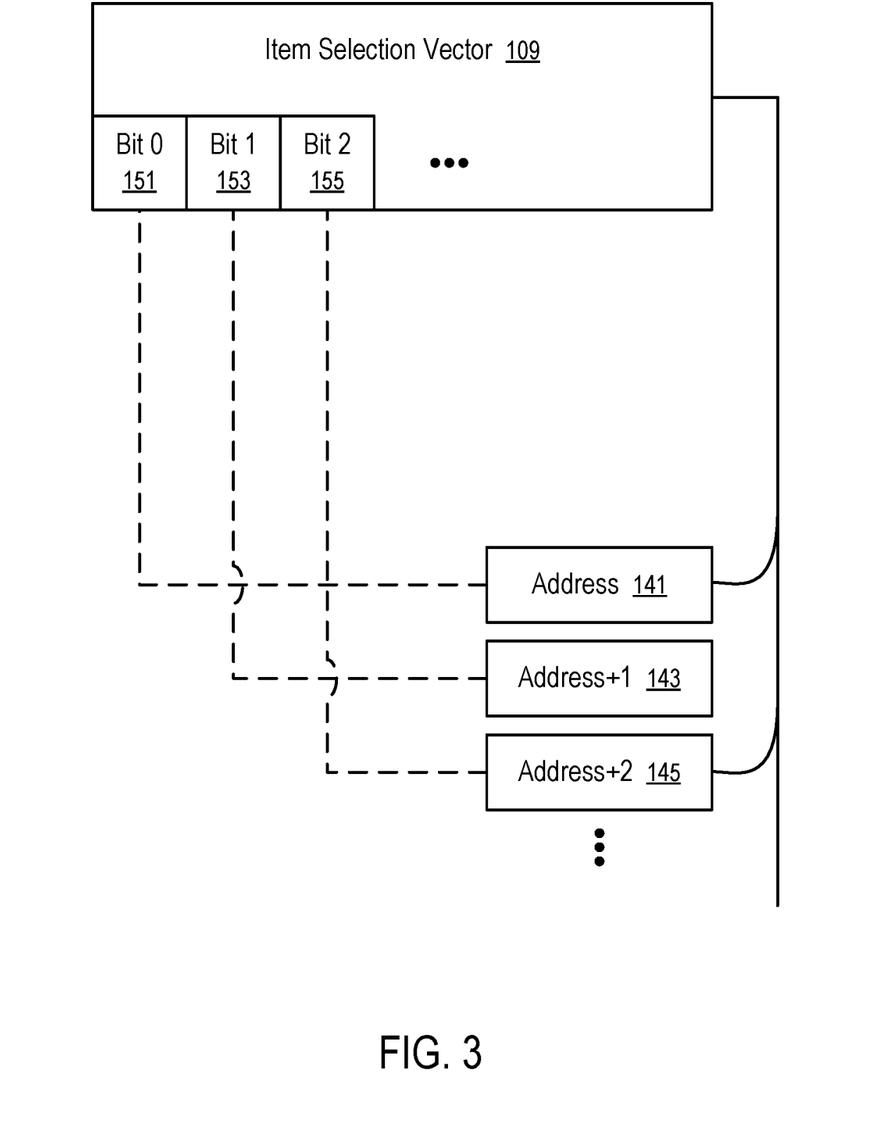
FIGS. 3, 4 and 5 illustrate examples of an item selection vector.
Figure 4:
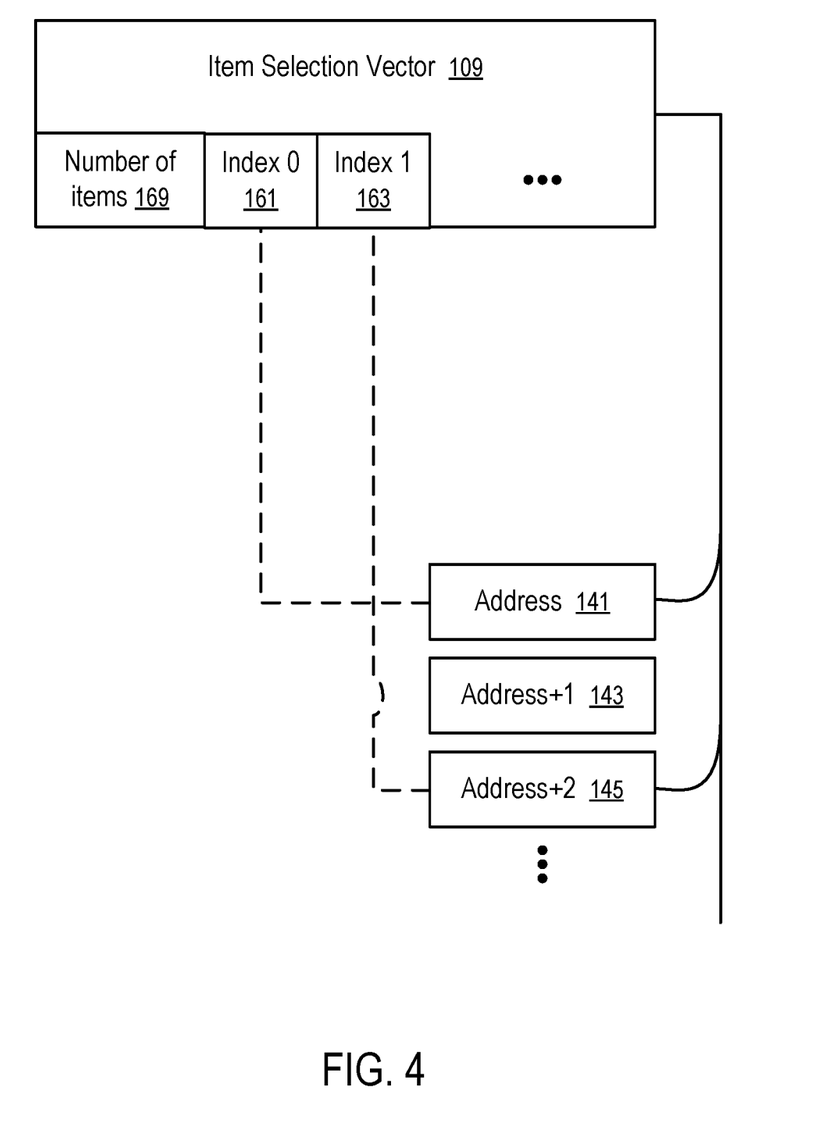
Figure 5:
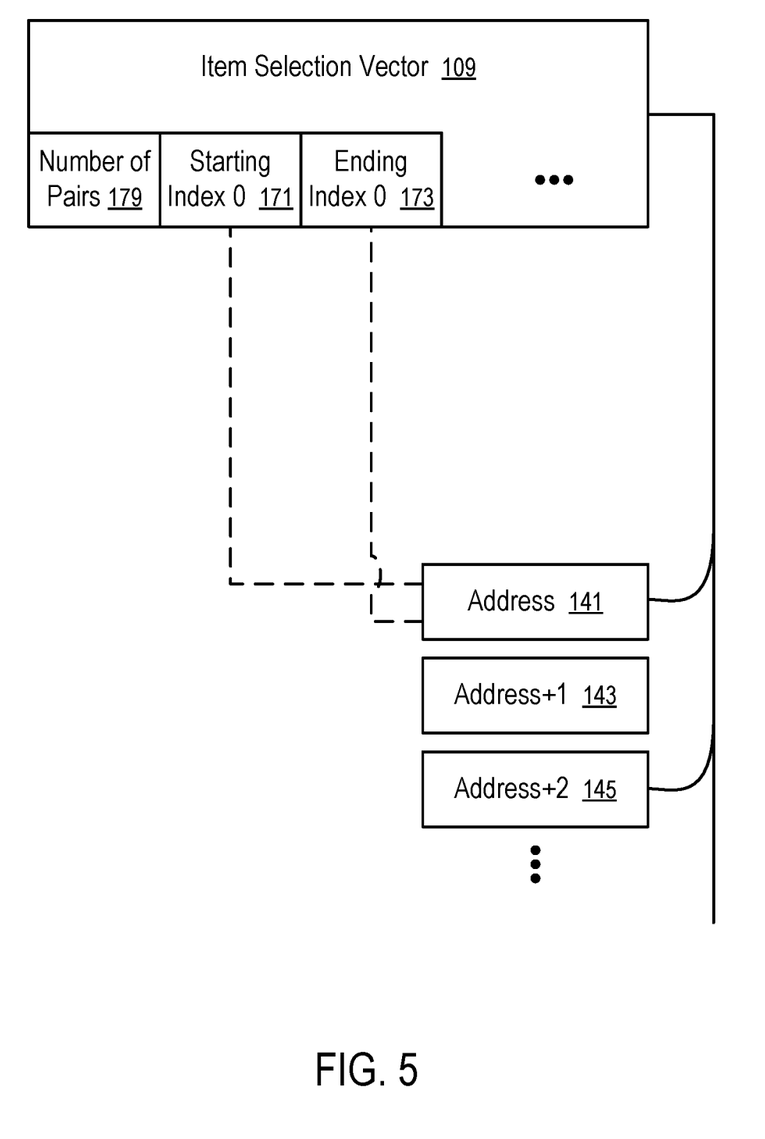

FIGS. 3, 4 and 5 illustrate examples of implementing an item selection vector (109) of FIG. 2.

The item selection vector (109) of FIG. 3 includes a predetermined number of bits (151, 153, 155, . . . ). Each of the bits (151, 153, 155, . . . ) corresponds to a respective address (141, 143, 145, . . . ) in a data block (131) of a predetermined size. When a bit (e.g., 151, 153, or 155) has a predetermined value (e.g., 1), the corresponding address (e.g., 141, 143, or 145) is included in the selection; and when the bit (e.g., 151, 153, or 155) has another predetermined value (e.g., 0), the corresponding address (e.g., 141, 143, or 145) is excluded from the selection.

FIG. 3 illustrates an implementation where each bit (e.g., 151, 153, or 155) is used to select one address (e.g., 141, 143, or 145). Alternatively, each bit (e.g., 151) can be used to select a predetermined number (e.g., 2, 3, or n) of adjacent addresses. Thus, when a bit is used to select n addresses, m bits in the item selection vector (109) can be used to select a portion from a block having n×m addresses.

The item selection vector (109) of FIG. 4 includes a variable number (169) of indices of items that are selected in the item selection vector (109). Each index (e.g., 161, 163, . . . ) identifies a position of a selected data item (e.g., 121, 125, . . . ) in the data block (131) and thus the corresponding address (e.g., 141, 145, . . . ) of the selected data item (e.g., 121, 125, . . . ).

In some implementations, the indices (e.g., 161, 163, . . . ) are specified to identify the items being included in the selection. In other implementations, the indices (e.g., 161, 163, . . . ) are specified to identify the items being excluded from the selection.

The item selection vector (109) of FIG. 4 can have a variable size that corresponds to the number of items (169) identified in the item selection vector (109).

FIG. 4 illustrates an example where each index (e.g., 161 or 163) is used to select a single address in the data block (131). Alternatively, each index (e.g., 161 or 163) can be used to select multiple adjacent address in the data block (131).

The item selection vector (109) of FIG. 5 includes a variable number (179) of pairs of indices to specify the items that are selected in the item selection vector (109). For example, a pair of indices (e.g., 171 and 173) can include a starting index (171) and an ending index (173). The starting index (171) identifies the starting point of a range of addresses that are being selected by the pair (171 and 173). The ending index (173) identifies the ending point of the range of addresses that are being selected by the pair (171 and 173).

In some implementations, the pairs of indices (e.g., 171 and 173) are specified to identify the ranges of items being included in the selection. In other implementations, the pairs of indices (e.g., 171 and 173) are specified to identify the ranges of items being excluded from the selection.

The item selection vector (109) of FIG. 5 can have a variable size that corresponds to the number of index pairs (179) identified in the item selection vector (109).

Different examples of implementing the item selector (109) as illustrated in FIGS. 3, 4 and 5 have advantages in some item selection scenarios but not in other scenarios (e.g., depending on the sparsity of item selections and/or pattern of selections).

In general, the different examples of the item selector (109) as illustrated in FIGS. 3, 4 and 5 can lead to different sizes of the item selector (109) for a given item selection scenario.

In some instances, a controller of the cache (101) can be configured to dynamically evaluate the size requirements of the different implementations and select an implementation that requires the smallest size and/or data processing. A type field can be included in the item selection vector (109) to identify the type of implementation of the item selection vector (109) such that the data fields within the item selection vector (109) can be interpreted according to the type of implementation of the item selection vector (109).

In some instances, the item selection vector (109) can be determined from a prior usage of a data block (131). For example, when a cache block (111) is requested for the first time, all of the data items (121, 123, 125, . . . , 129) in the corresponding data block (131) can be loaded. During executing, the controller of the cache (101) notes that only certain data items (e.g., 121, 125) from the data block (131) are used. Thus, the item selection vector (109) is generated from the usage pattern of the data block (131). Consequently, subsequent loads of the same data block (131) into the cache block (111) only load the words previously used, as indicated by the item selection vector (109).

In some instances, the item selection vector (109) can be identified via information provided by a programmer/compiler. For example, a compiler can be configured to provide switches/options for cache optimization. When a computer program is coded for sparse computation, the usage of a cache block loaded according to a conventional method can be very sparse. For example, when a cache block has eight 64-bit words, it may be that only one of the eight cached 64-bit words is actually used; and thus, the bandwidth and energy used for caching the other seven 64-bit words is wasted. When the programmer or the compiler indicates that only a particular word in the cache block is used, the compiled instructions are configured to identify the item selection vector (109) that selects the 64-bit word that is to be actually used; and the remaining seven 64-bit words are not loaded from the memory (103) into the cache (101).

In one embodiment, when the controller of the cache (101) requests data from the memory (103), the data request identifies the data block (131) and the item selection vector (109). For example, the data block (131) can be identified using a starting memory address (141) of the data block (131); and the item selection vector (109) can be implemented using any of the examples illustrated in FIGS. 3, 4 and 5. A controller of the memory (103) gathers the data item (e.g., 121, 125, . . . ) identified by the item selection vector (109) and transmits the data items (e.g., 121, 125, . . . ) to the cache (101) in a batch without transmitting any of the items that are not selected (e.g., 123). Thus, the addresses of the selected data items (e.g., 121, 125, . . . ) are not transmitted individually from the controller of the cache (101) to the memory (103) to address and retrieve the selected data items (e.g., 121, 125, . . . ).

When the cache block (105) is configured to have a predetermined size that is the same as the size of the data block (e.g., 131) in the memory, the batch of data received from the memory (103) can be rearranged in the cache block according to the item selection vector (109) such that the received data items are stored at locations corresponding to their storage locations when the entire data block (131) is retrieved.

Alternatively, the cache block (105) can have a variable size of storage capacity allocated/determined by the item selection vector (109).

Similarly, when the controller of the cache (101) requests to store the cached data (111) into the memory (103), the request identifies the data block (131) (e.g., via a starting address (141) of the data block (131)) and the item selection vector (109). The memory (103) receives the data batch that contains only the selected items but not non-selected items. The memory (103) stores the received data items that are provided in the batch data transmission and store them at the corresponding addresses identified by the item selection vector (109).

In some implementations, a controller is configured to transport data items between the cache (101) and the memory (103) one data item at a given address at a time. In such implementations, the controller is configured to interpret the item selection vector (109) to generate a sequence of selected addresses and schedule data read or write commands at the addresses to load or store the cached data (111).

Since the non-selected data items are not transmitted across the communication connection between the cache (101) and the memory (103), the performance of data access related to the cache (101) is improved.

Further, when the non-selected data items do not use/consume the storage capacity of the cache (101), the utilization rate of the capacity of the cache (101) increases, which can improve the performance of the computer system.

In general, a computer system can have multiple levels caches. For example, a cache memory inside a processor can cache the data available on an external cache, which in turn caches data available on a main memory and/or a storage device. The variable caching techniques for data blocks can be applied to each level of caching operations.

For example, the cache (101) can be an internal cache of a CPU and the memory (103) can be an external cache of the CPU, a main memory of the computer, a storage device of the computer, or a storage device of a remote computer. For example, an internal cache of a CPU can be formed on the same semi-conductor die of the CPU; and an external cache of the CPU can be formed on a semi-conductor die that is separate from the semi-conductor die. For example, a cache formed in the same semi-conductor die of the CPU, or enclosed in a same integrated circuit package of the CPU, is closer to the CPU in data access paths than a memory connected to the CPU via a printed circuit board.

For example, the cache (101) can be an external cache of a CPU and the memory (103) can be a main memory of the computer, a storage device of the computer, or a storage device of a remote computer.

For example, the cache (101) can be a portion of a main memory of a computer, and the memory (103) can be a storage device of the computer, or a storage device of a remote computer.

In some instances, the entire memory (103) can be treated as a single data block; and the entire cache (101) can be used as a single cache block. The computer system can predict or compute the desired selection of items and, based on the prediction/computation, update the item selection vector (109) of the cache (101) in response to changing demand for data caching. When the item selection vector (109) is updated, the cached data (111) can be loaded/stored accordingly to implement the change.

Figure 6:
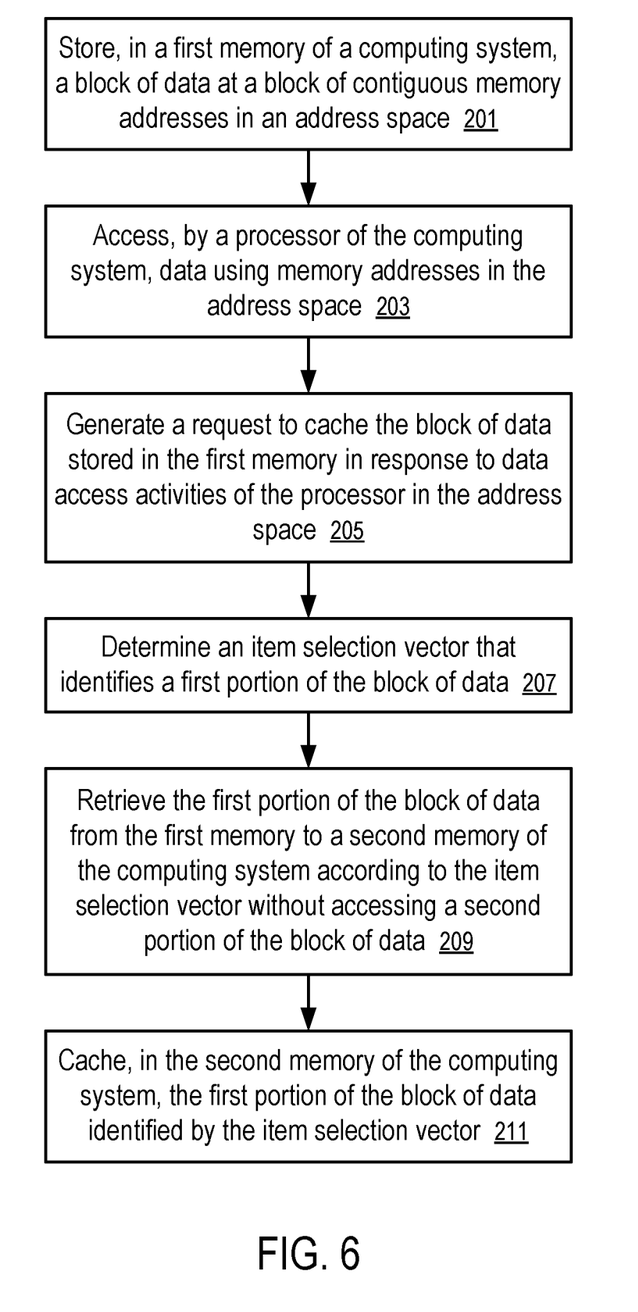
FIG. 6 shows a method of data communication for cache operations.

FIG. 6 shows a method of data communication for cache operations. For example, the method of FIG. 6 can be used in caching data of the memory (103) in the cache (101) of FIG. 1, using an item selection vector (109) of FIG. 2. The item selection vector (109) of FIG. 2 can be implemented according to any of the examples of FIGS. 3, 4 and 5.

At block 201, a first memory (e.g., 103) of a computing system stores a block (131) of data at a block of contiguous memory addresses (141, 143, 145, . . . ) in an address space.

At block 203, a processor of the computing system accesses data using memory addresses (e.g., 141, 143, or 145) in the address space.

At block 205, the computing system generates a request to cache the block (131) of data stored in the first memory (103) in response to data access activities of the processor in the address space.

At block 207, the computing system determines an item selection vector (109) that identifies a first portion (e.g., 121, 125, . . . ) of the block (131) of data.

At block 209, the computing system retrieves the first portion (e.g., 121, 125, . . . ) of the block (131) of data from the first memory (103) to a second memory (101) of the computing system according to the item selection vector, without accessing a second portion (e.g., 123, . . . ) of the block (131) of data.

At block 211, the second memory (101) of the computing system caches the first portion (e.g., 121, 125, . . . ) of the block (131) of data identified by the item selection vector (109).

For example, the second memory (101) stores tag information (113) that identifies the block of contiguous memory addresses (141, 143, 145, . . . ) among a plurality of blocks of contiguous memory addresses (e.g., corresponding to the memory addresses of the data blocks (131, . . . , 133). The plurality of blocks of contiguous memory addresses can have a same size. Data stored at the blocks of contiguous memory addresses in the first memory (103) can be cached in a same memory location (e.g., in a same cache block (105)) in the second memory (101) one data item at a time for one memory address, or in different memory locations (e.g., in cache blocks (105, . . . , 107)) concurrently.

For example, some of the different data blocks (131, . . . , 133) of the first memory (103) can be cached in different cache blocks (105, . . . , 107) in the second memory (101). Each of the cache blocks (105, . . . , 107) can have a separate item selection vector (e.g., 109) that identifies the selected data items (e.g., 121, 125, . . . ) cached in the corresponding cache block (e.g., 105).

In some implementations, item selection vectors of different cache blocks (e.g., as implemented according to the examples of FIG. 4 or 5) have different sizes. In other implementations, item selection vectors of different cache blocks (e.g., as implemented according to the example of FIG. 3) have different sizes.

In some implementations, different cache blocks (105, . . . , 107) in the second memory (101) can have different data storage capacities. Since the positions of the cache blocks (105, . . . , 107) in the second memory (101) may change from time to time, a look up table can be used to identify the current location of a cache block (e.g., 105) in the second memory (101). For example, some of the cache blocks (105, . . . , 107) can have a storage capacity for a number of data items that equals to a smaller power of two (2) (e.g., a cache block size of 4 or 8); and other of the cache blocks (105, . . . , 107) can have a storage capacity for a number of data items that equals to a larger power of two (2) (e.g., a cache block size of 8 or 16). For example, an instruction can be configured to specify the address range and the block size of a cache block; and a compiler, based on reference patterns, can infer an optical cache block size. Alternatively, a programmer may set a compiler switch to identify reference patterns.

In other implementations, different cache blocks (105, . . . , 107) in the second memory (101) can have a same size in storage capacity. Thus, the positions of the cache blocks (105, . . . , 107) in the second memory (101) can be predetermined. Since only a portion of data items (e.g., 121, 125, . . . ) selected by an item selection vector (109) of a cache block (105) is actually cached in the cache block (105), a remaining portion of the storage capability of the cache block (105) is typically not used. Although the cache blocks (105, . . . , 107) have a same storage size in such implementations, the amounts of data items actually cached in the different cache blocks (105, . . . , 107) can differ from one cache block (e.g., 105) to another (e.g., 107), depending upon the content of their item selection vectors (e.g., 109).

In some implementations, each cache block (105, . . . , or 107) in the second memory (101) has the same size in storage capacity as each data block (131, . . . , or 133) in the first memory (103). The collection of data items (121, 125, . . . ) identified by the item selection vector (109) of a cache block (105) can be stored at corresponding locations where the data items (121, 125, . . . ) are stored when the entire data block (131) are retrieved and cached in the cache block (105).

In some implementation, a cache controller (or a memory controller or memory management unit) of the computing system is configured to transmit the item selection vector (109) to a controller of the first memory (103) in requesting the data from the data bock (131). In response, the controller of the first memory (103) retrieves the first portion (e.g., 121, 125) of the data block (131) from the first memory (103) according to the item selection vector (109) and transmits the first portion (e.g., 121, 125, . . . ) in a batch to the second memory (101) without the second portion (e.g., 123, . . . ).

In general, the second memory (101) has a storage capacity that is smaller than the storage capacity of the first memory (103). Data from different blocks (131, . . . , 133) of the first memory (103) of a same size can be cached in different cache blocks (105, . . . , 107) of a same size, or different sizes, in the second memory (101). The cache blocks (105, . . . , 107) store tag information (e.g., 113) for the respective cache blocks (105, . . . , 107) to identify the data blocks (131, . . . , 133) in the first memory (103) that are cached respectively in the cache blocks (105, . . . , 107). Further, the cache blocks (105, . . . , 107) store their respective item selection vectors (e.g., 109).

Figure 7:
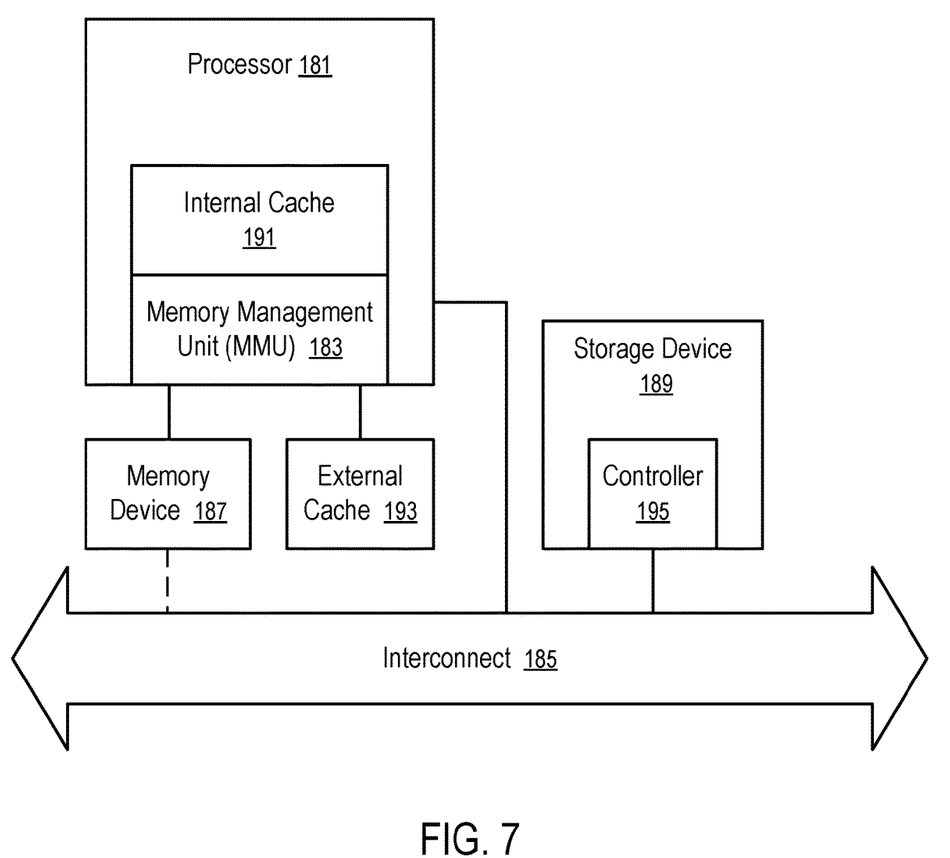
FIG. 7 show a computing system in which the method of FIG. 6 can be implemented for caching operations.

FIG. 7 show a computing system in which the method of FIG. 6 can be implemented for caching operations.

The computing system of FIG. 7 can include a processor (181) having an internal cache (191), a memory device (187), an external cache (193), and a storage device (189) that is connected to the processor (181) and/or the memory (187) via an interconnect (185).

For example, the processor (181) can have registers to contain memory addresses. Examples of such registers include a program counter for loading instructions for execution, and a memory address register. When an instruction is being executed in the processor, the memory address stored in the memory address register can be used to load an operand of the instruction, and/or store a computing result generated from executing the instruction. In some instances, the addresses used the registers of the processor (181) are virtual memory addresses; and a memory management unit (MMU) (183) can convert the virtual memory addresses to physical memory addresses to access the external cache (193), the memory device (187), and/or the storage device (189).

For example, the data in the memory device (187) can be cached in the external cache (193) of the processor (181) and/or the internal cache (191) of the processor (181).

For example, the data in the external cache (193) can be cached in the internal cache (191).

For example, the data in the storage device (189) can be cached in the memory device (187), in the external cache (193), and/or in the internal cache (191).

Each level of caching operating in the computing system of FIG. 7 can optionally use the method of FIG. 6.

In some instances, the memory management unit (MMU) (183) controls the data movement among the internal cache (191), the external cache (193), and the memory device (198).

The memory management unit (MMU) (183) may access the data items at one address at a time. In such an implementation, the memory management unit (MMU) (183) can convert the item selection vector (109) to a sequence of addresses (e.g., 141, 145, . . . ) to move data items one address at a time.

In some implementations, the memory device (187) or the external cache (193) has a separate controller. The memory management unit (MMU) (183) can transmit to the controller the item selector vector (109) as a parameter of a batch memory access command. In response, the controller can selectively retrieve data items according to the item selector vector (109) to return retrieved data items in a batch mode, which can be more efficient than the memory management unit (MMU) (183) retrieve data items at one address at a time.

Similarly, the item selector vector (109) can also be transmitted to the controller (193) of the storage device (189) to retrieve a portion of a data block for caching in the memory (187), in the external cache (193), and/or in the internal cache (191).

The techniques disclosed herein can be applied to at least to computer systems where processors are separated from memory and processors communicate with memory and storage devices via communication buses and/or computer networks. Further, the techniques disclosed herein can be applied to computer systems in which processing capabilities are integrated within memory/storage. For example, the processing circuits, including executing units and/or registers of a typical processor, can be implemented within the integrated circuits and/or the integrated circuit packages of memory media to performing processing within a memory device. Thus, a processor (e.g., 101) as discussed above and illustrated in the drawings is not necessarily a central processing unit in the von Neumann architecture. The processor can be a unit integrated within memory to overcome the von Neumann bottleneck that limits computing performance as a result of a limit in throughput caused by latency in data moves between a central processing unit and memory configured separately according to the von Neumann architecture.

The description and drawings of the present disclosure are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications can be made thereto without departing from the broader spirit and scope as set forth in the following claims. The specification and drawings are, accordingly, to be regarded in an illustrative sense rather than a restrictive sense.

What is claimed is:

1. A computing device, comprising:
   a processor configured to access data using memory addresses in an address space;
   a first memory configured to store a block of data at a block of contiguous addresses in the space of memory address; and
   a second memory configured to cache a first portion of the block of data identified by an item selection vector, wherein the item selection vector has a sequence of bits corresponding to a plurality of contiguous addresses for the block of data, and a count of bits in the item selection vector corresponds to a count of the plurality of contiguous addresses for the block of data;
   wherein the computing device is configured to communicate the first portion of the block of data from the first memory to the second memory according to the item selection vector, in response to a request to cache the block of data stored in the first memory;
   wherein the computing device communicates the first portion from the first memory to the second memory without communicating a second portion of the block of data in response to the request;
   wherein the second memory is configured to store tag information identifying the block of contiguous addresses among a plurality of blocks of contiguous addresses.

2. The computing device of claim 1, wherein the different cache blocks in the second memory have different sizes.

3. The computing device of claim 1, wherein the different cache blocks in the second memory have a same size but have different sizes of cached portions of data from the different blocks in the first memory.

4. The computing device of claim 1, wherein each of the different cache blocks stores a separate item selection vector.

5. The computing device of claim 4, wherein item selection vectors of the different cache blocks have different sizes.

6. The computing device of claim 1, wherein the item selection vector has a list of indices identifying the portion of the first portion of the block of data.

7. The computing device of claim 1, wherein the item selection vector has a list of index pairs, each identifying a range of the block of contiguous addresses in the space of memory address.

8. A method, comprising:
   storing, in a first memory of a computing system, a block of data at a block of contiguous memory addresses in an address space;
   accessing, by a processor of the computing system, data using memory addresses in the address space; and
   in response to a request to cache the block of data stored in the first memory,
     communicating a first portion of the block of data from the first memory to a second memory of the computing system according to an item selection vector, wherein the item selection vector has a sequence of bits corresponding to a plurality of contiguous addresses for the block of data, and a count of bits in the item selection vector corresponds to a count of the plurality of contiguous addresses for the block of data; and caching, in the second memory of the computing system, the first portion of the block of data identified by the item selection vector;

wherein in response to the request, the communicating of the first portion is performed according to the item selection vector without accessing a second portion of the block of data.

9. The method of claim 8, wherein the plurality of blocks of contiguous memory addresses have a same size; and the method further comprises:

storing in the second memory tag information identifying the block of contiguous memory addresses among a plurality of blocks of contiguous memory addresses; and caching different blocks in the plurality of blocks in different cache blocks in the second memory.

10. The method of claim 9, wherein the different cache blocks in the second memory have different data storage capacities.

11. The method of claim 9, wherein the different cache blocks in the second memory have a same size but have different sizes of cached portions of data from the different blocks in the first memory.

12. The method of claim 9, further comprising:

storing a separate item selection vector for each of the different cache blocks.

13. The method of claim 12, wherein item selection vectors of the different cache blocks have different sizes.

14. The method of claim 8, wherein the communicating of the first portion of the block of data from the first memory to the second memory comprises:

transmitting the item selection vector to a controller of the first memory;

retrieving the first portion of the block of data from the first memory according to the item selection vector; and transmitting the first portion of the block of data in a batch to the second memory.

15. A non-transitory computer storage medium storing instructions which when executed in a computing system, cause the computing system to perform a method, the method comprising:

storing, in a first memory of the computing system, a block of data at a block of contiguous memory addresses in an address space;

accessing, by a processor of the computing system, data using memory addresses in the address space; and in response to a request to cache the block of data stored in the first memory, communicating a first portion of the block of data from the first memory to a second memory of the computing system according to an item selection vector without accessing a second portion of the block of data, wherein the item selection vector has a sequence of bits corresponding to a plurality of contiguous addresses for the block of data, and a count of bits in the item selection vector corresponds to a count of the plurality of contiguous addresses for the block of data; and caching, in the second memory of the computing system, the first portion of the block of data identified by the item selection vector;

wherein in response to the request, the communicating of the first portion is performed according to the item selection vector without accessing the second portion of the block of data; and the second portion is communicated from the first memory to the second memory when an alternative item selection vector is used to cache the block of data.

16. The non-transitory computer storage medium of claim 15, wherein the method further comprises:

caching data from different blocks of the first memory of a same size in different cache blocks of different sizes in the second memory;

storing tag information for the different cache blocks to identify the different blocks in the first memory respectively; and storing different item selection vectors for the different cache blocks respectively.

* * * * *